US006210141B1

(12) United States Patent
Allen

(10) Patent No.: US 6,210,141 B1
(45) Date of Patent: Apr. 3, 2001

(54) MODULAR DIE WITH QUICK CHANGE DIE TIP OR NOZZLE

(75) Inventor: Martin A. Allen, Dawsonville, GA (US)

(73) Assignee: Nordson Corporation, Westlake, OH (US)

(*) Notice: Subject to any disclaimer, the term of this patent is extended or adjusted under 35 U.S.C. 154(b) by 0 days.

(21) Appl. No.: 09/021,426

(22) Filed: Feb. 10, 1998

(51) Int. Cl.[7] .............................. B29C 47/12; D01D 5/14
(52) U.S. Cl. .............................. 425/7; 425/72.2; 425/186; 425/188; 425/192 S; 425/463; 425/464
(58) Field of Search .............................. 425/7, 72.2, 83.1, 425/382.2, 463, 464, 192 S, 190, 186, 188; 264/12

(56) References Cited

U.S. PATENT DOCUMENTS

| | | | | |
|---|---|---|---|---|
| 2,257,695 | * | 9/1941 | Lihotzky | 425/188 |
| 3,302,240 | * | 2/1967 | Loos | 425/190 |
| 3,488,806 | | 1/1970 | De Cecco et al. . | |
| 3,500,499 | | 3/1970 | Goosens . | |
| 3,891,379 | | 6/1975 | Lenk | 425/464 |
| 4,073,850 | | 2/1978 | Brockman et al. | 264/12 |
| 4,785,996 | | 11/1988 | Ziecker et al. | 239/298 |
| 4,917,355 | * | 4/1990 | Dark et al. . | |
| 4,983,109 | | 1/1991 | Miller et al. | 425/7 |
| 5,007,328 | * | 4/1991 | Otteman . | |
| 5,145,689 | | 9/1992 | Allen et al. | 425/72.2 |
| 5,236,641 | | 8/1993 | Allen et al. | 264/40.1 |
| 5,353,949 | * | 10/1994 | Seibert et al. . | |
| 5,382,312 | | 1/1995 | Raterman | 156/500 |
| 5,445,509 | * | 8/1995 | Allen et al. | 425/72.2 |
| 5,542,838 | * | 8/1996 | Wilhelm et al. | 425/186 |
| 5,580,581 | * | 12/1996 | Buehning | 425/72.2 |
| 5,632,938 | | 5/1997 | Buehning, Sr. | 264/39 |
| 5,728,219 | * | 3/1998 | Allen et al. | 425/464 |

FOREIGN PATENT DOCUMENTS

| | | |
|---|---|---|
| 54-73916 | 6/1979 | (JP) . |

* cited by examiner

*Primary Examiner*—Harold Pyon
*Assistant Examiner*—Joseph Leyson
(74) *Attorney, Agent, or Firm*—Wood, Herron & Evans, L.L.P.

(57) ABSTRACT

An adhesive dispensing die module for mounting on a manifold incudes (a) a die body having formed therein polymer and air flow passages, and a valve for selectively closing the polymer flow passage and (b) a die tip or die nozzle detachably mounted on the die body. The die tip or die nozzle is secured to the die body by a pair of clamping members depending from the die body and adapted to engage die tip or die nozzle therebetween. The clamping members can selectively be moved toward one another to clampingly secure the die tip or die nozzle therebetween or moved away from one another to release the die tip or die nozzle, permitting it to be replaced without the need to remove the die module from the manifold.

20 Claims, 5 Drawing Sheets

MODULAR DIE WITH QUICK CHANGE DIE TIP OR NOZZLE

BACKGROUND OF THE INVENTION

This invention relates generally to dies for applying hot melt adhesives to a substrate using meltblowing, spiral, bead, spray, or coating patterns. In one aspect, the invention relates to modular die bodies with interchangeable and replaceable die tips or nozzles. In still another aspect the invention relates to an inexpensive disposable die module.

The deposition of hot melt adhesives onto substrates has been used in a variety of applications including diapers, sanitary napkins, surgical drapes, and the like. This technology has evolved from the application of linear beads such as that disclosed in U.S. Pat. No. 4,687,137, to air assisted deposition such as that disclosed in U.S. Pat. No. 4,891,249, and to spiral deposition such as that disclosed in U.S. Pat. Nos. 4,949,668 and 4,983,109. More recently, meltblowing dies have been adapted for the application of hot melt adhesives (see U.S. Pat. No. 5,145,689).

At the present, the most commonly used adhesive applicators are intermittently operated air assisted dies. U.S. Pat. No. 5,618,566 discloses a modular die assembly comprising a row of side-by-side modules mounted on a manifold. Each module is provided with a die tip or nozzle through which the adhesive is extruded. U.S. Pat. No. 5,728,219 discloses a modular die assembly comprising side-by-side modules mounted on a manifold. Selected modules of the array may be provided with different types of extrusion die tips or nozzles. The term "nozzle" is used herein in the generic sense to describe the part of the applicator which determines the pattern of adhesive deposition (e.g. spray, bead, spiral, coating or meltblown). The nozzles for bead and spiral deposition are adapted to deposit a monofilament onto a substrate. The nozzles for meltblown applicators, also referred to as die tips, are designed to meltblow a row of filaments onto the substrate. Nozzles for bead and coating deposition are non-air assisted.

The availability of different types of nozzles for each module permits the operator to select a variety of deposition patterns. Each of the nozzle types has its own advantages and disadvantages. Meltblown nozzles provide a generally uniform covering of a predetermined width of the substrate, but do not provide precise edge control which is needed or desirable in some applications. On the other hand, the spiral nozzles deposit a controlled spiral bead on the substrate giving good edge control but not uniform substrate coverage. The bead and coating nozzles provide a heavier adhesive deposit than the meltblown or spiral patterns.

In order to replace a nozzle of a particular die module in the die assembly disclosed in U.S. Pat. No. 5,618,566, or change a nozzle type of a module in the die assembly disclosed in U.S. Pat. No. 5,728,219, it generally is necessary to (1) remove the module from the manifold (2) unscrew the four bolts mounting the nozzle assembly to the module, (3) substitute the new nozzle for the old nozzle, (4) resecure the nozzle assembly to the module, and (5) reattach the module to the manifold. Although this is a simple procedure compared to the non-modular die constructions, it nevertheless requires some shutdown time (on the order of 30 to 60 minutes). For this reason, the entire module is generally replaced and the old module repaired.

SUMMARY OF THE INVENTION

The modular dies of the present invention feature a die module having a quick disconnect assembly that permits the die tip or nozzle to be replaced without removing the module from the die manifold. Briefly, the die module comprises two main components: a die body mounted on a manifold, and a die tip or nozzle mounted on the die body. The die tip or nozzle is secured to the die body by a pair of clamping members adapted to engage opposite edges or sides of the die tip or nozzle. The members with the die body mounted on the manifold are movable between a clamping position and a nonclamping position. In the clamping position, the die tip or nozzle is forcefully secured to the die body. In the nonclamping position, the die tip or nozzle is free to be removed from the die body.

A novel feature of the invention vis-a-vis prior art die modules is the principle of operation of the clamping means for securing the die tip or nozzle to the body.

In the prior art devices (e.g. those disclosed in U.S. Pat. No. 5,618,566), the die tip is secured to the die body by bolts which apply a force in a direction normal to the plane of the mounting surface. In the module of the present invention, the mounting clamps create opposite forces on the opposite ends of the die tip, each force having a major component in a direction parallel to the plane of the die tip mounting surface and a component of forcing action in a direction normal to the mounting surface. The clamping force thus may be activated by a single pressure member (e.g. bolt) acting on one of the clamping members.

Another important novel feature of the clamping means is the location of the pressure member. Since only a single pressure applying member is needed it can be conveniently placed on the exposed front surface of the die body, permitting the clamping member to be activated or deactivated without removing the module from the manifold.

The die body comprises three main components: an upper body portion, a lower body portion and a cap. These components may be fabricated by interference fits which avoids the expensive machining required in prior art modules.

The interference-fit construction prevents access to the die body interior for repair. However, this is not a problem because economically it is cheaper to dispose of the damaged or faulty module and replace it with a new one.

DESCRIPTION OF THE PREFERRED EMBODIMENT

Figure 1:
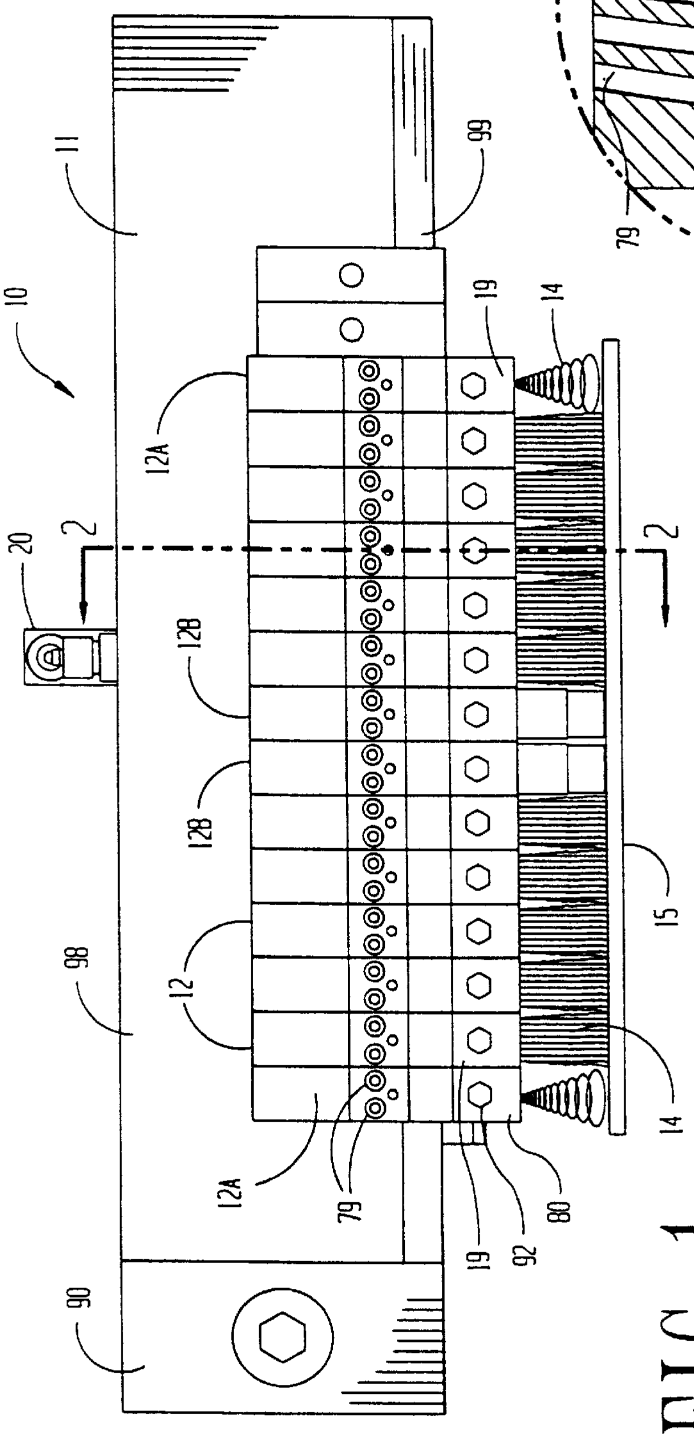
FIG. 1 is a front elevational view of the die assembly constructed according to the present invention and provided with three different applicator nozzles.
Figure 2:
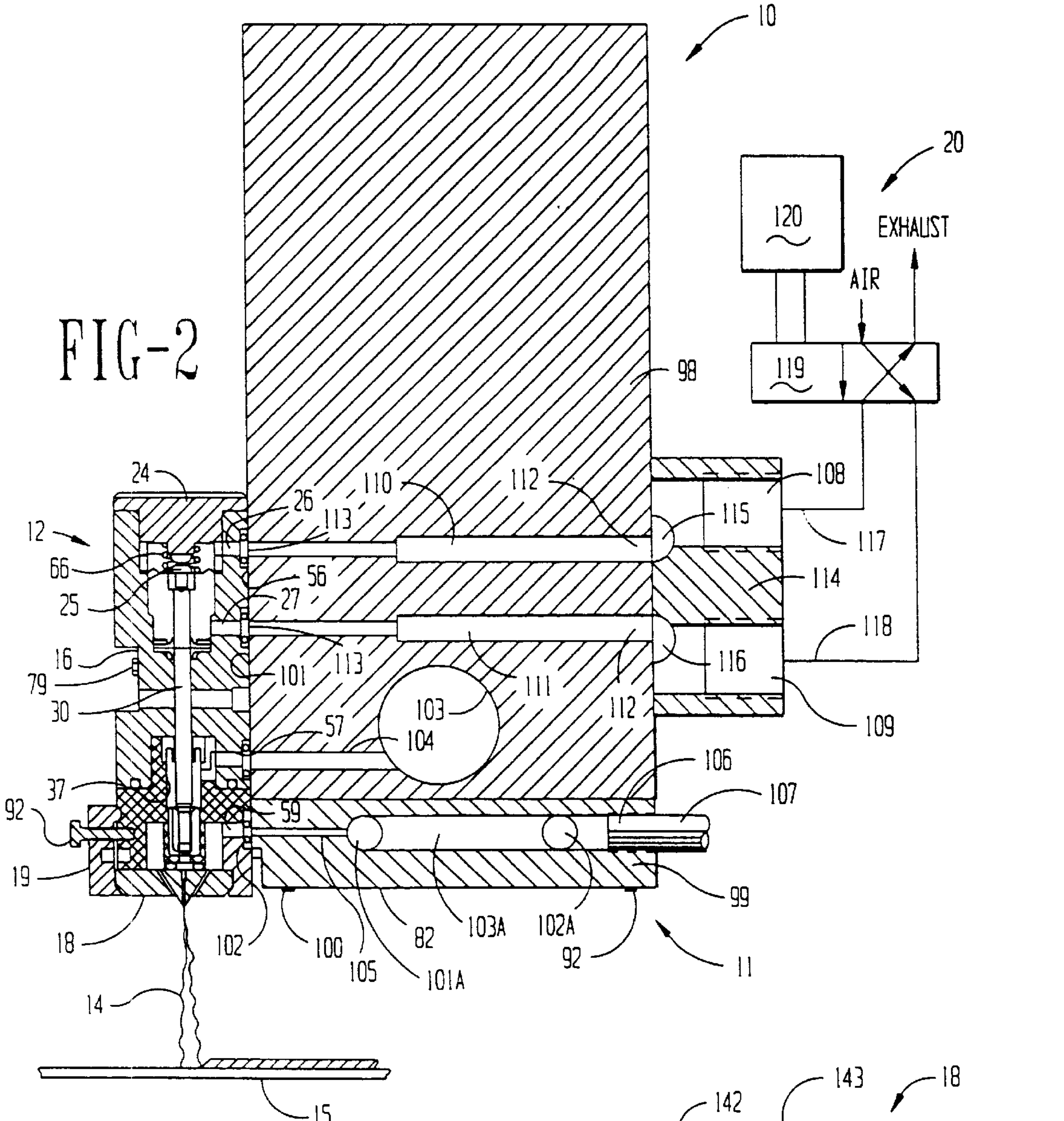
FIG. 2 is an enlarged sectional view of the modular die shown in FIG. 1 with cutting plane indicated by 2—2 thereof.

With reference to FIGS. 1 and 2, the modular die assembly 10 of the present invention comprises a manifold 11, a plurality of side-by-side self-contained die modules 12, and a valve actuator assembly including actuator 20 for controlling the polymer flow through the modules 12. As best seen in FIG. 2, each module 12 includes a die body 16, a die tip or a nozzle 18, and nozzle retainer 19. Filaments 14 are discharged from modules 12 onto a substrate 15 (or collector). The manifold 11 distributes a hot melt adhesive and hot air to each of the modules 12. The modular die 10 includes meltblowing die tips 18 mounted on most of the die bodies 16. Some of the modules 12, however, may be provided with various types of nozzles. As illustrated in FIG. 1, end modules 12A are provided with spiral nozzles and center modules 12B are provided with coating nozzles. Spray nozzles and bead nozzles may also be used.

The main components mentioned above are described in detail below.

Die Body

Figure 3:
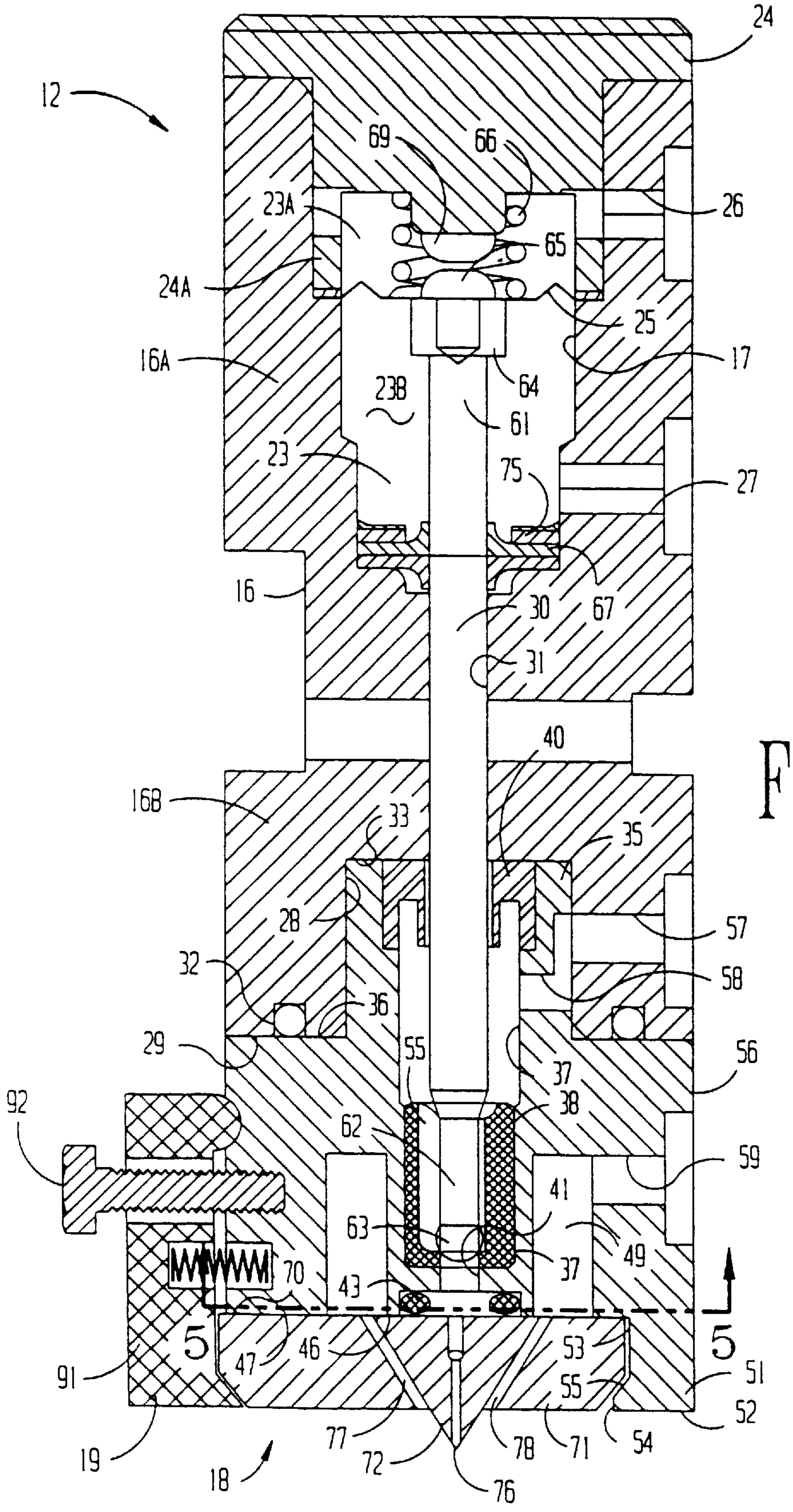
FIG. 3 is an enlarged view of FIG. 2, illustrated internal features of the die module.

As best seen in FIG. 3, the die body 16 may be constructed in two parts, an upper die body portion 16A and a lower die body portion 16B. For convenience of description these body portions will be referred to a merely as upper die body 16A and lower die body 16B. Die body 16A has an upper circular recess 17 formed therein, the upper end of which is closed by cap 24. The cap 24 has a skirt portion 24A, which in combination with the wall of recess 17 defines a generally cylindrical chamber 23.

A diaphragm 25 is mounted in chamber 23 dividing it into an upper chamber 23A and a lower chamber 23B.

Side ports 26 and 27 are formed in the wall of the die body 16A to provide communication to chambers 23A and 23B, respectively. As described in more detail below, the ports 26 and 27 serve to conduct air (referred to as instrument gas) to and from chambers 23A and 23B.

Die body 16A has formed therein a lower downwardly opening recess 28 surrounded by annular surface 29 and defined in part by surface 33. A central bore 31 formed in die body 16A extends downwardly from chamber 23B to recess 28. As described below, bore 31 receives valve stem 30.

The lower die body 16B has a cylindrically shaped projection 35 adapted to fit in the recess 28 as illustrated in FIG. 3. Surface 36 surrounding the base of cylindrical member 35 engages surface 29 of die body 16A, with o-ring 32 provided at the junction thereof. Surfaces 29 and 36 may be of the same general shape.

A bore 37 extends downwardly through die body 16B terminating at bottom surface 39. A stem seal 40 (e.g. spring lip seal) is mounted in the upper end of the bore 37, and a valve insert 38 is mounted in the lower end of the bore 37 in contact with bottom surface 39 (see FIG. 4). Ports 41 and 42 formed, respectively, in insert 38 and surface 39 serve as a fluid outlet for bore 37. The lower end of opening 42 is provided with an O-ring 43. The bore 37 may be of variable diameter to accommodate the parts mounted therein.

The inlet to opening 41 is chamfered to provide a valve seat 44 for a valve stem 30 as described below.

Figure 4:
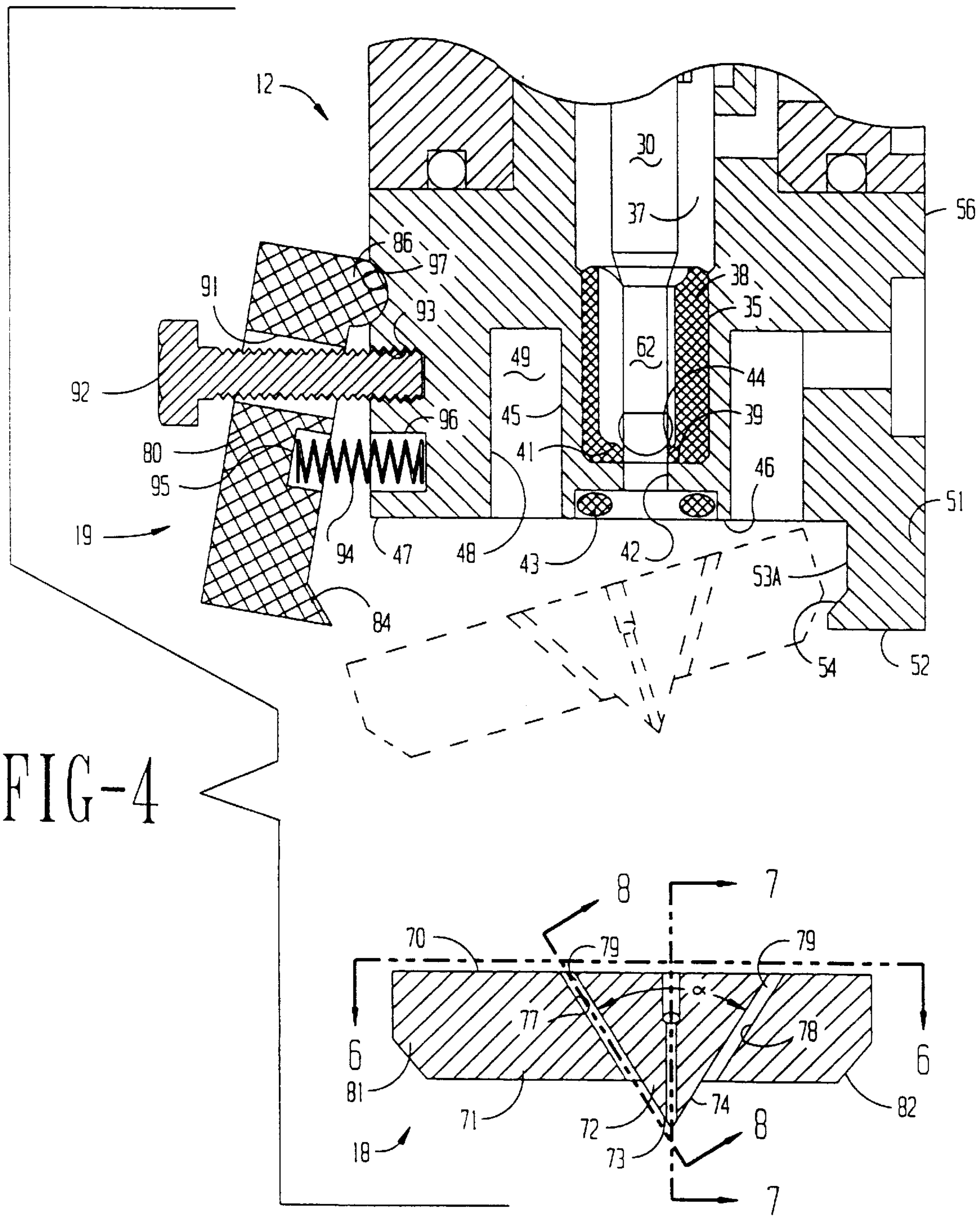
FIG. 4 is a fragmented view of the module shown in FIG. 3, illustrating the removal of a die tip from the die body.
Figure 5:
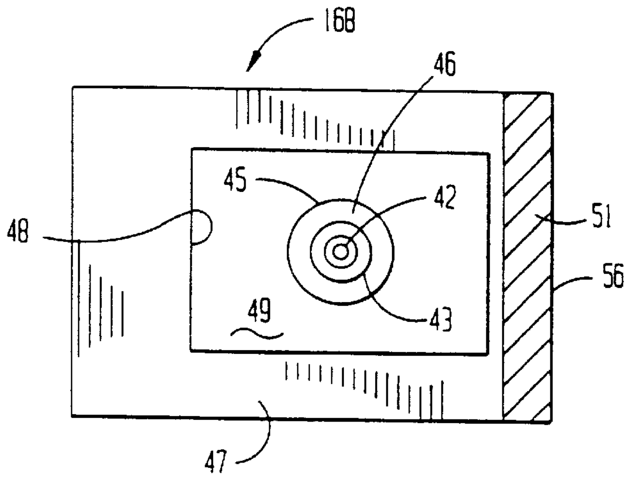
FIG. 5 is a sectional view of the module shown in FIG. 3 with the cutting plane taken along line 5—5 thereof.

As shown in FIGS. 4 and 5 the lower end of the die body 16B has formed therein a downwardly opening air chamber 49 which surrounds a central cylindrical portion 45. The air chamber 49 is defined by interior walls 48 and cylindrical portion 45. Bore 37 and port 42 are formed in the cylindrical projection 45. Bottom surfaces 46 and 47 of die body 16B are coplanar for receiving a die tip or nozzle 18 as described in detail below.

The back side 56 (side mounted on the manifold 11) of body 16B has a downwardly projecting narrow edge portion 51 terminating at end 52.

The inner surface 53 of edge portion 51 is shaped to receive and support a complementary shaped edge portion of a die tip or nozzle 18. As illustrated, the inner surface 53 is provided with a vertical wall and a downwardly tapered shoulder 54 projecting inwardly (with respect to die body 16A) from the lower edge of wall 53. The shoulder 54 has a flat angular surface for supporting an edge portion of die tip or nozzle 18.

A polymer flow passage 57 formed in die body 16A registers with polymer flow passage 58 formed in projection 35. These passages deliver polymer melt to bore 37.

Air passage 59, formed in die body 16B, serves to deliver air to air chamber 49.

A valve assembly is provided in the module 12 to selectively start and stop the polymer flow therethrough. The valve seat 44 is opened or closed by movement of the diaphragm 25 which in turn moves stem 30.

The valve stem 30 extends from chamber 23B through opening 31 and into bore 37. The upper end 61 of stem 30 is secured to diaphragm 25 and a lower end portion 62 of stem 30 is specially shaped to fit into the valve insert 38. The insert 38 may be made of wear resistant material (carbide) and may include internal longitudinal ribs (spider members, one shown as 55) for guiding the stem portion 62 into the interior of the insert 38 and to permit the flow of fluid therethrough. The tip 63 of the stem is shaped to seat on the valve seat 44.

The stem upper end 61 is provided with a collar 64 which is threaded for receiving bolt 65. Bolt 65 secures the diaphragm 25 to the upper end 61 of stem 30. A spring 66, interposed between cap 24 and diaphragm 25, urges the diaphragm 25 and valve stem 30 downwardly causing the valve tip 63 to seat on valve seat 44. A wipe seal 67 is provided around stem 30 at the upper end of opening 31 formed in die body 16A.

As described in detail below, the valve seat 44 is opened by activating chamber 23B with instrument gas moving the diaphragm 25 and valve stem 30 upwardly, and compressing spring 66. This moves valve tip 63 off of its valve seat 44. The upper extent of the diaphragm 25 movement is set by the space between bolt head 65 and downwardly projecting head 69.

Die Tip or Nozzle and Retainer

The die tip or nozzle 18 is adapted to be mounted on the downwardly facing and coplanar surfaces 46 and 47 of body 16B. The nozzle 18 illustrated in FIGS. 2, 3 and 4, is a meltblowing die tip, but as described below, may be a nozzle such as a spiral nozzle, a bead nozzle, a spray nozzle or a coating nozzle.

As shown in FIGS. 3 and 4, the die tip 18 comprises a base member 71 which is generally coextensive with the mounting surface 47 of die body 16B, and a triangular nosepiece 72 which may be integrally formed with the base 71. The nosepiece 72 is defined by converging surfaces 73 and 74 which meet at apex 76. The apex 76 may be discontinuous, but preferably is continuous along the die module 12. The height of the nosepiece 72 may vary from 100% to 25% of the overall height of the die tip 18, but preferably is not more than 50% and most preferably between 20% and 40%.

Figure 6:
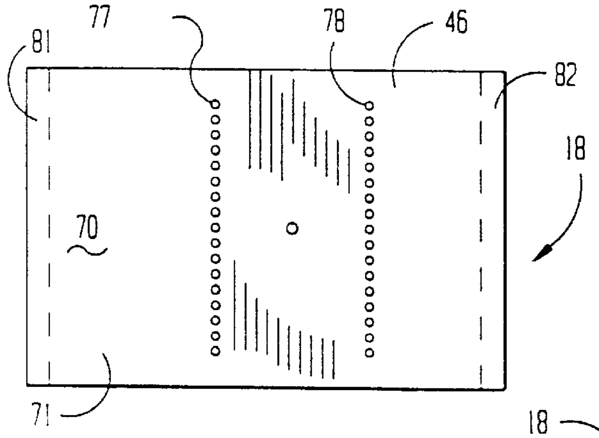
FIG. 6 is a view of the die tip shown in FIG. 4 taken from the perspective of the plane along line 6—6 thereof.

The portions of the base 71 extending laterally from the nosepiece 72 serve as flanges for mounting the die tip 18 to the die body 16B and having passages for conducting air and polymer melt through the base 71. As best seen in FIG. 6, the flanges of the base 71 have two rows of air holes 77 and 78 formed therein. As shown in FIG. 4 the rows of air holes 77 and 78 define converging planes. The plane defined by air holes 77 extends at the same angle as nosepiece surface 73, and the plane defined by air holes 78 extend at the same angle as nosepiece surface 74. The included angles (α) of the planes and surfaces 73 and 74 ranges from 30° to 90°, preferably from 60° to 90°. (It is understood that reference to holes lying in a plane means the axes of the holes lie in the plane.)

Figure 9:
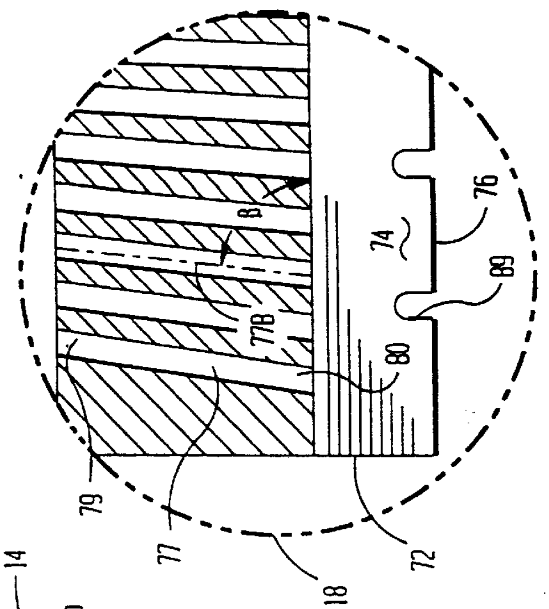
FIG. 9 illustrates the angle β of the air holes in relation to the apex.
Figure 8:
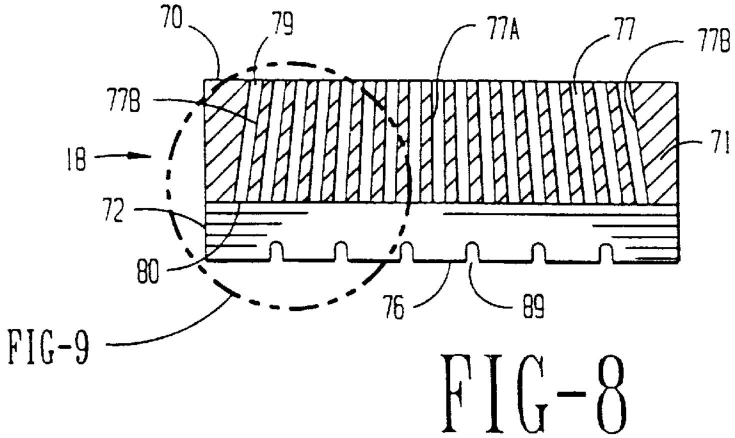
FIG. 8 is a sectional view of the die tip nozzle of FIG. 4, with the cutting plane taken along line 8—8 thereof.

While each row of air holes 77 and 78 lie in their respective planes, at least some of the air holes 77 and 78 within their respective planes need not be parallel. As best seen in FIGS. 8 and 9, the die tip 18 is provided with an odd number (e.g. 17) of air holes 77, each having an inlet 79 and an outlet 80. (Note the row of air holes 78, on the opposite side of the nosepiece 72 is preferably the mirror image of the row of air holes 77, although they need not be. For example the air holes 78 may be offset from air holes 77.)

The die tip 18 further includes surface 70 which is mounted on surface 47 of the die body 16A, closing cavity 49. Surface 70 also engages surface 46 with O-ring 43 providing a fluid seal at the junction of these two surfaces. Surface 70 is substantially coextensive with the outer periphery of surface 47.

With the die tip 18 mounted on the die body 16, the inlets 79 of all of the air holes 77 and 78 register with cavity 49 as shown in FIG. 3.

The central air holes (in this embodiment air hole 77A) extends perpendicular to the apex 76 as shown in FIG. 8. One or more air holes 77 located at the longitudinal center of the die tip 18 may extend parallel to air hole 77A. In designs with an even number of air holes 77, at least two of the center air holes 77A are preferably provided.

The air holes 77 flanking the center air hole 77A form an angle β (see FIG. 9) with the apex 76 which decreases progressively (arithmetic) and symmetrically from the center hold 77A outwardly. The outermost holes are shown as 77B on FIGS. 8 and 9. The air holes 77B form an angle with the apex 76 that decreases in constant increments outwardly. For example, center air hole 77A forms an angle of 90° with the apex 76. If the angle increment is −1°, then the two air holes 77 adjacent air hole 77A form an angle of 89° with the apex 76. Continuing the incremental arithmetic progression to the eighth (outermost) air holes 77B, the angle of these air holes would be 82°. Of course, the incremental angle may vary, but preferably is between ½ and 4° most preferably between 1° and 3.5°. The arithmetic progression may be represented by the following equation:

$$\text{Angle } \beta = 90° - n\iota$$

Where n is the hole position or each side of the center air hole and preferably ranges from 4 to 15, most preferably 5 to 10 and ι is the constant incremental degree change.

Figure 7:
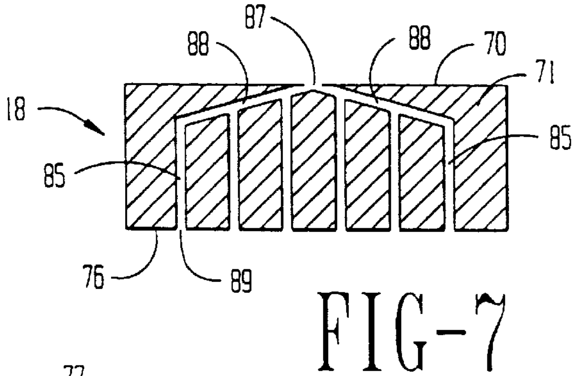
FIG. 7 is a cross-sectional view of the die tip nozzle shown in FIG. 4 with the cutting plane taken along line 7—7 thereof.

Polymer passages 85 are formed in the die tip 13, as shown in FIGS. 4 and 7. The passages 85 may be in the form of a distribution system comprising a plurality of passages 85 connected to inlet 87 by passage 88. Inlet 87 registers with die body port 42 with die tip 18 mounted on die body 16A.

The passages 85 have outlets at 89 which are uniformly spaced along the apex 76. Passages 85 preferably extend perpendicular to apex 76. The design illustrated in FIG. 7 serves well for small modules (i.e. lengths less than about 3" to 4"). For longer dies, a pressure balance coat hanger design may be preferred. The passages 85 are preferably small diameter orifices and serve as the fiber forming means. The die tip body 71 has beveled edges 81 and 82 as shown in FIG. 4 which define surfaces for engaging complementary shaped retaining shoulders 54 and 84 of the clamping members.

The nozzle retainer means is a quick disconnect design permitting the die tip 18 to be quickly and easily replaced, requiring only a few minutes. Key to the quick disconnect feature is a retainer plate 80 mounted on the front of die body 16A as shown in FIGS. 3 and 4. The plate 80 comprises body portion having an inwardly projecting (with respect to the die body 16A) shoulder 84 at its lower end and a inwardly projecting rounded member 86 at its upper end.

A hole 91 found in an intermediate portion of plate 80 receives bolt 92 which screws into threaded hole 93 found in die body 16A. Two side by side compression springs, one shown at 94, are mounted in recesses 95 and 96 and bias plate 80 outwardly with respect to die body 16A.

The rounded member 86 extends horizontally along the face of die body 16A and is received in a complementary shaped round groove 97 to form a hinge structure.

The die tip 18 is secured to the die body 16A by unscrewing the bolt 92 sufficiently to permit the lower end 84 to move outwardly by action of springs 94. The die tip 18 is inserted in place with beveled edge 82 supported on shoulder 54 of member 52. The bolt 92 is screwed into body 16A. This compresses the springs 94 and brings shoulder 84 into contact with beveled edge 81 of die tip 18.

The clamping action of the plate 80 squeezes the die tip 183 between clamping member 51 and lower clamping member 80 (plate). The wedging action of beveled surfaces 81 and 82 engaging surfaces 54 and 84 causes the die tip 18 to move upwardly into sealing engagement with surfaces 46 and 47 of die body 16A and o-ring 43. The wedging action of the clamping member imparts a squeezing horizontal force component and a vertical force component on the die tip 18.

The rounded member 86 pivots within groove 97 as the plate 80 is moved by action of the bolt 92.

The die tip 18 is replaced by merely unscrewing the bolt 92 sufficiently to permit the die tip 18 to be removed from the die body 16A, as illustrated in FIG. 4.

Figure 10:
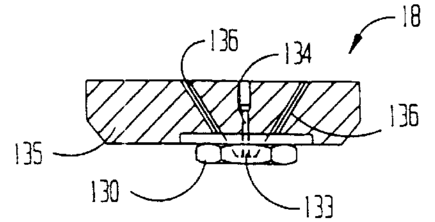
FIGS. 10 and 11 are sectional views of different applicator nozzles useable in the module disclosed in FIGS. 2, 3 and 4.
Figure 11:
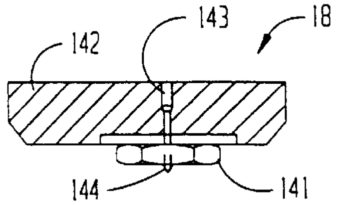

As mentioned above, the quick change feature enables the die tip 18 to be replaced with the same or different type nozzles. FIGS. 10 and 11 depict different types of nozzles 18 that may be mounted on die body 16A.

As shown in FIG. 10, the nozzle 18 for generating a spiral filament comprises a circular nozzle 130 threadedly mounted in a body 135. Extending axially through the circular insert member 130 is a polymer passage 134 that discharges at the apex of cone 133. Angular air passages 136 extend through the body member and are angularly oriented with respect to the axis of polymer passage 134. The direction of the air passages 136 are such to impart a circular or helical motion to the polymer as the air from the plurality of air passages 136 contact the polymer discharging from the polymer passage 134. The orientation of the air passages with respect to the polymer filament can be in accordance with U.S. Pat. No. 5,102,484 or U.S. Pat. No. 4,983,109, the disclosures of which are incorporated herein by reference.

The body 135 is adapted to be mounted on the module body 16A as described with respect to the meltblowing die tip 18. With the nozzle 130 positioned in body 135 and mounted on surfaces 46 and 47, air passage 136 are in fluid communication with air cavity 49, and polymer flow passage 134 is in fluid communication with port 42.

A bead or coating nozzle 18 (without air assistance) is disclosed schematically in FIG. 11. With this structure, the bead nozzle 141 is threadedly mounted in body 142, similar to body 135 described with reference to the spiral nozzle 130, and a polymer flow passage 143 extends axially therethrough, but this nozzle has no air passages. When mounted on the die body 16A, the inlet of flow passage 143 is in fluid communication with polymer flow passage port 42. The nozzle has an inverted conical portion 144, through which passage 143 extends to a position within about ½ to 1 inch from the substrate for depositing the bead or coating thereon. Since air is not used with this nozzle, the nozzle 141 in combination with the body 142 blocks out or seals the air chamber 49.

Since the bodies of the die tip or nozzles 18, regardless of the type, are shaped to fit onto the die body 16A in the same manner as described above, they are interchangeable. That is, a module 12 along the die assembly 10, (as shown in FIG. 1) may be provided with any of the nozzles or die tip, or may change one for another at any time by merely releasing the clamping means and replacing the nozzle as described above.

The Manifold

As best seen in FIG. 2, the manifold 11 is constructed in two parts: an upper body 98, and a lower body 99 bolted to the upper body by spaced bolts 100. The upper body 98 and lower body 99 have mounting surfaces 101 and 102, respectively, which lie in the same plane for receiving modules 12. Surface 56 of each module engage surfaces 101 and 102 of manifold 11.

The upper manifold body 98 has formed therein polymer header passages 103 extending longitudinally along the interior of body 98 and side feed passages 104 spaced along the header passage 103 for delivering polymer to each module 12. The polymer feed passages 104 have outlets which register with passage 57 of its associated module 12. The polymer header passage 103 has a side inlet at one end of the body 98 and terminates at near the opposite end of the body 98. A connector block 90 (see FIG. 1) bolted to the side of body 98 has a passage for directing polymer from feed line to the header channel 103. The connector block 90 may include a polymer filter. A polymer melt delivered to the die 10 flows from a source such as an extruder or metering pump through connector block 90 to passage 103 and in parallel through the said feed passages 104 to the individual modules 12.

Returning to FIG. 2, air is delivered to the modules 12 through the lower block 99 of the manifold 11. The air passages in the lower block 99 are in the form of a network of passages comprising a pair of passages 101A and 102A, interconnecting side ports 103A, and module air feed ports 105 longitudinally spaced along bore 101A. Air inlet passage 106 connects to air feed line 107 near the longitudinal center of block 99. Air feed ports 105 register with air passage 59 of its associated module.

Heated air enters body 99 through line 107 and inlet 106. The air flows through passage 102A, through side passages 103A into passage 101A, and in parallel through module air feed ports 105 and module passages 59. The network design of manifold 99 serves to balance the air flow laterally over the length of the die 10.

The instrument air for activating each module valve is delivered to the chamber 23 of each module 12 by air passages formed in the block 98 of manifold 11. As best seen in FIG. 2, instrument air passages 110 and 111 extend through the width of body 98 and each has an inlet 112 and an outlet 113. Outlet 113 of passage 110 registers with port 26 formed in module 12 which leads to chamber 23A; and outlet 113 of passage 111 registers with port 27 of module 12 which leads to chamber 23B.

An instrument air block 114 bolted to block 98 and traverses the full length of the instrument air passages 110 and 111 spaced along body 98. The instrument air block 114 has formed therein two longitudinal channels 115 and 116. With the block 114 bolted to body 98, channels 115 and 116 communicate with the instrument air passages 110 and 111, respectively. Instrument tubing 117 and 118 delivers instrument air from control valve 119 to flow ports 108 and 109 and passages 110 and 111 in parallel.

For clarity, actuator 20 and tubing 117 and 118 are shown schematically in FIG. 2. Actuator 20 comprises three-way solenoid air valve 119 coupled with electronic controls 120.

The manifold 11 is described in more detail in U.S. Pat. No. 5,618,566, the disclosure of which is incorporated herein by reference.

Assemblage and Operation

The three main components of the die body 16 may be assembled by interference fit. Other fabrication means may be used such as those described in the above referenced U.S. Pat. No. 5,618,566, but the interference assemblage is inexpensive. Since the interference fit precludes disassembly for repair, they are disposable after use. The nozzles and plates, of course can be removed before disposal.

The three body components 24, 16A and 16B are assembled by an interference fit. The skirt 24A fits in circular recess 17 and cylindrical member 35 fits in recess 28. The clearance between the male members and female members of these couplings is 0.0015 to 0.0020. The parts are hydraulically pressed together at a high pressure (in the range of 1,000 to 2,000 psi, typically 1,500 psi).

The hydraulic pressing procedure may be as follows:

(a) the upper die body 16A with internal members (diaphragm 25, wiper seal 67, spring 66, and stem 30) inserted therein is pressed fit with cap 24. The diaphragm 25, is inserted in recess and is held in place by skirt 24A; and the wiper seal 67 is held in place by retainer ring 75.

(b) This assembly then is press fit with the lower die body 16B (recess 27 mated with projection 35) having internal parts mounted therein.

A particularly advantageous feature of the present invention is that it permits (a) the construction of a meltblowing die with a wide range of possible lengths using standard sized manifolds and interchangeable, self-contained and disposable modules, and (b) variation of die nozzles (e.g. meltblowing, spiral, or bead applicators) to achieve a predetermined and varied pattern. Variable die length and adhesive patterns may be important for coating substrates of different sizes from one application to another. The following sizes and numbers are illustrative of the versatility of modular construction.

| Die Assembly | Broad Range | Preferred Range | Best Mode |
|---|---|---|---|
| Number of Modules | 3–6,000 | 5–100 | 10–50 |
| Length of Modules (inches) | 0.25–3.00" | 0.5–1.50" | 0.5–0.8" |
| Orifice Diameter (inches) | 0.005–0.050" | 0.01–0.040" | 0.015–0.030" |
| Orifices/Inch (for each module) | 5–50 | 10–40 | 10–20 |
| No air holes (77)/ Inch | 15–50 | 20–40 | 25–35 |

-continued

| Die Assembly | Broad Range | Preferred Range | Best Mode |
|---|---|---|---|
| No air holes (78)/ Inch | 15–50 | 20–40 | 25–35 |
| Air hole Diameter (inch) | 0.05–0.050 | 0.010–0.040 | 0.15–0.030 |
| No Air hole/No Orifices | 1–10 | 3–8 | 4–6 |

Depending on the desired length of the die, standard sized manifolds may be used. For example, a die length of one member could employ 54 modules mounted on a manifold 40 inches long. For a 20 inch die length, 27 modules would be mounted on a 20 length manifold. Note that the modules 10 are mounted in side-by-side relation using bolts 79 which extend through the die body 16A and screw into manifold block 98. O-rings may be mounted around passages extending from manifold 11 into die body 16.

As indicated above, the modular die assembly can be tailored to meet the needs of a particular operation. As exemplified in FIG. 1 the die assembly 10 comprises fourteen modules 12, two of which have spiral nozzles, two have coating nozzles and ten have meltblowing die tips. The lines, instruments, and controls are connected and operation commenced. A hot melt adhesive is delivered to the die 10 through block 90, hot air is delivered to the die through line 107, and instrument air or gas is delivered through lines 117 and 118.

Actuation of the controls 20, pressurizes chamber 23B, and vents chamber 23A. This moves diaphragm 25 and stem 30 upwardly, opening port 42 of each module as described previously causing polymer melt to flow through each module 12. In the meltblowing modules 12, the melt flows in parallel streams through manifold passages 104, through side ports 57, through bore 37, and through ports 41 and 42 into the die tip 18. The polymer melt is distributed laterally and discharges through orifices 85 as side-by-side filaments 14. Hot air meanwhile flows from manifold passages 103A into port 59 through chamber 49, holes 78 and 79, and discharges it as converging air jets at the nosepiece 72. The converging air jets contact the filaments discharging from the orifices and by drag forces stretch them and deposit them onto an underlying substrate 15 in a random pattern. This forms a generally uniform layer of meltblown material on the substrate.

In each of the flanking spiral nozzle modules 12A the polymer flows from manifold through passage 57, through bore 37, through ports 41 and 42, through passage 134 of nozzle 130 (FIG. 10) discharging at the apex of cone 133. Air flows from manifold passage 105, passage 59 into chamber or cavity 49, through passages 136. Air discharging from passages 136 impart a swirling motion of the polymer issuing from passage 134. The polymer is deposited on the substrate as a circular or helical bead, giving good edge control for the adhesive layer deposited on the substrate.

Typical operational parameters are as follows:

| | |
|---|---|
| Polymer | Hot met adhesive |
| Temperature of the Die and Polymer | 280° F. to 325° F. |
| Temperature of Air | 280° F. to 325° F. |
| Polymer Flow Rate | 0.1 to 10 grms/hole/min. |
| Hot Air Flow Rate | 0.1 to 2 SCFM/inch |
| Deposition | 0.5 to 500 g/m$^2$ |

As indicated above, the die assembly 10 may be used in meltblowing any polymeric material, but meltblowing adhesives is the preferred polymer. The adhesives include EVA's (e.g. 20–40 wt % VA). These polymers generally have lower viscosities than those used in meltblown webs. Conventional hot melt adhesives useable include those disclosed in U.S. Pat. Nos. 4,497,941, 4,325,853, and 4,315,842, the disclosure of which are incorporated herein by reference. The preferred hot melt adhesives include SIS and SBS block copolymer based adhesives. These adhesives contain block copolymers, tackifier, and oil in various ratios. The above melt adhesives are by way of illustration only; other melt adhesives may also be used.

The wide bead nozzles 12B are positioned at an interval location of the assembly shown in FIG. 1. This array of modules with three different applicator heads deposits a layer of meltblown (random filaments) onto the substrate with an internal wide bead for increased strength as required in diaper lamination, and flanking spiral beads for edge control.

The locations of the types of die tips and nozzles may be changed along the die by merely unscrewing the retainer plate bolt, withdrawing the nozzle and replacing it with another nozzle. If the internal parts become inoperative, the module may be removed from the manifold and replaced with a new module.

In summary, the die assembly of the present invention embodies several features:

(a) a quick change die tip or nozzle (b) interferences fit construction (c) a solid state die tip (d) interchangeable nozzles on each module.

Although the die modules and assemblies of the present invention has been described with particular reference to hot melt adhesive applications, it will be appreciated by those skilled in the art that the invention also applies to meltblowing of polymers to form nonwovens.

What is claimed is:

1. A die module for dispensing a polymer melt comprising:

(a) a die body having (i) an air flow passage formed therein (ii) a polymer melt flow passage formed therein, (iii) valve means for opening and closing said polymer melt flow passage; and (iv) a nozzle mounting surface;

(b) a nozzle positioned on said mounting surface of said die body and having at least one orifice formed therein and air passages formed therein, said orifice and said air passages being in fluid communication with said polymer melt flow passage and said air passage of said die body, respectively, and (c) a clamping structure affixed to said die body for clamping said nozzle securely to said mounting surface of said die body by the application of clamping force on opposite sides of said nozzle with a force component substantially parallel to said nozzle mounting surface, said clamping structure including a hinged member pivotally affixed to said die body and pivotally movable between a clamped position and an unclamped position thereby permitting said nozzle to be removed from said mounting surface.

2. The die module of claim 1 wherein said clamping structure further includes a fixed member depending from said die body and cooperating with said hinged member to secure said nozzle to said mounting surface, said hinged member being moveable forward and away from said fixed member whereby movement of said hinged member in one direction causes said clamping structure to forcefully engage said nozzle securing said nozzle to said mounting surface, and movement of said hinged member in the opposite direction moves said clamping structure apart permitting said nozzle to be removed from said mounting surface.

3. The die module of claim 1 wherein said nozzle is a meltblowing die tip.

4. The die module of claim 1 wherein said nozzle is selected from the group consisting of meltblown die tips, spiral nozzles, bead nozzles, spray nozzles, and coating nozzles.

5. The die module of claim 2 wherein each of said clamping members includes wedging surfaces engageable with opposite sides of said nozzle to impart an inward and upward clamping force on said nozzle attendant to movement of said hinged member in said one direction whereby said clamping members force said nozzle upwardly into sealing engagement with said mounting surface.

6. The die module of claim 2 wherein said hinged member comprises a retainer plate having a lower end engageable with one side of said nozzle, said plate being secured to said die body by a bolt whereby turning said bolt in one direction causes said plate to move into forceful engagement with said one side of said nozzle and turning said bolt in the opposite direction causes said plate to move away from said one side of said nozzle.

7. The die module of claim 6 wherein said retainer plate further includes a spring for biasing said plate away from said nozzle.

8. The die module of claim 1 wherein said valve means includes a movable member selected from a piston or diaphragm mounted in said die body, a valve seat formed in said polymer melt flow passage, a valve stem having an upper end secured to said moveable member and a lower end adapted to seat on said valve seat and means for selectively moving said moveable member (a) upwardly whereby said lower end of said valve stem moves off said valve seat, and (b) downwardly whereby said lower end of said valve stem seats on said valve seat.

9. The die module of claim 8, wherein said moveable member is a diaphragm.

10. A modular die assembly for depositing a hot melt adhesive onto a substrate which comprises:

(a) a manifold having adhesive and air passages formed therein;

(b) a plurality of substantially identical modular die bodies mounted in side-by-side relation on said manifold, each of said die bodies having an inner surface in contact with said manifold and an opposite outer surface facing outwardly from said manifold and having an adhesive passage and an air passage in fluid communication with said adhesive passage and air passage of said manifold exiting through a downwardly facing mounting surface;

(c) an air-assisted die nozzle mounted on said mounting surface of each of said die bodies, each of said die nozzles having an adhesive flow passage and an air passage formed therein in fluid communication with said adhesive flow passage and air flow passage, respectively, of said die body, the improvement comprising a pair of members depending from said die body for clampingly engaging opposite sides of said die nozzle, at least one of said members being hingedly secured to said die body for allowing selective pivotal movement of said one member toward the other member to clamp said die nozzle therebetween.

11. The modular die assembly of claim 10 wherein each die body includes a meltblowing nozzle secured thereto, and at least one side module includes a spiral nozzle.

12. The modular die assembly of claim 10 wherein each die nozzle is selected from the group consisting of meltblowing, spiral, and spray nozzles, said nozzles being interchangeable on each die module.

13. The modular die assembly of claim 10 wherein said members include a nonmoveable clamping member depending from a back surface of said module and a moveable clamping member depending from and secured to a front surface of said module, and means for applying a clamping force to said moveable clamping member to clampingly engage said die nozzle between said moveable and nonmoveable members.

14. The module die assembly of claim 13 wherein said moveable clamping member is in the form of a plate, and said means for applying a force thereto is a bolt extending through said plate and threadedly mounted on said front surface of said die body, whereby turning said bolt in one direction causes said plate to apply a clamping force on said nozzle and turning of said bolt in the opposite direction releases said clamping force on said nozzle, permitting said nozzle to be removed from said die body.

15. The modular die assembly of claim 14 and further comprising a spring interposed between said plate and said die body to bias said plate outwardly.

16. The modular die assembly of claim 14 wherein said moveable clamping member and said nonmoveable clamping member each includes an inwardly projecting wedge surface for contacting said nozzle therebetween and forcing said nozzle upwardly into forceful engagement with said mounting die body surface.

17. A die module for dispensing liquids, the module comprising:

a die body having a liquid inlet passage and a liquid outlet passage, a valve disposed within said die body and moveable between open and closed positions to respectively allow and prevent liquid flow through said liquid outlet passage, a nozzle coupled to said die body and having a dispensing orifice communicating with said liquid outlet passage, and a spring-biased clamping member coupled with said die body and engaging said nozzle, said clamping member being spring biased away from said die body and moveable between clamped and unclamped positions relative to said nozzle to allow said nozzle to be quickly attached to and removed from said die body.

18. The die module of claim 17, wherein said spring-biased clamping member is secured to said die body with a hinge structure.

19. The die module of claim 18 further comprising a stationary clamping member positioned on an opposite side of said nozzle relative to said spring-biased clamping member and said nozzle is held between said spring-biased clamping member and said stationary clamping member.

20. The die module of claim 19 further comprising respective wedging surfaces on said nozzle, said stationary clamping member and said spring-biased clamping member, said wedging surfaces holding said nozzle on said die body.

* * * * *